United States Patent [19]

Anderson et al.

[11] Patent Number: 4,554,169
[45] Date of Patent: Nov. 19, 1985

[54] PROCESS FOR PREPARED, GELATIN-CONTAINING FOOD PRODUCTS

[75] Inventors: Noel E. Anderson, Portage, Mich.; Donald E. Fletcher, Equing; Michael S. Smagula, Plainsboro, all of N.J.; Darrell S. Parker, Avon, N.Y.

[73] Assignee: General Foods Corporation, White Plains, N.Y.

[21] Appl. No.: 711,420

[22] Filed: Mar. 13, 1985

[51] Int. Cl.$^4$ ............................................. A23L 1/04
[52] U.S. Cl. ............................ 426/576; 426/249; 426/565
[58] Field of Search ..................... 426/576, 249, 565

[56] References Cited

U.S. PATENT DOCUMENTS

| | | | |
|---|---|---|---|
| 3,889,002 | 6/1975 | Clausi et al. | 426/576 |
| 4,224,353 | 9/1980 | Kueper et al. | 426/576 |
| 4,297,379 | 10/1981 | Topalian et al. | 426/576 |
| 4,341,810 | 7/1982 | Shank | 426/576 |
| 4,500,553 | 2/1985 | Liggett et al. | 426/576 |

FOREIGN PATENT DOCUMENTS 1137298  9/1962  Fed. Rep. of Germany ...... 426/576

Primary Examiner—Jeanette Hunter
Attorney, Agent, or Firm—Thomas R. Savoie; Sam D. Walker; Daniel J. Donovan

[57] ABSTRACT

A continuous process for the preparation of ready-to-eat gelatin-containing compositions is made possible by the preparation of an agitated slurry of partially-hydrated gelatin particles which may be stored at room temperature or below for periods in excess of four days and rapidly transformed into a gelatin solution by passage through a continuous, high-temperature, short-time pasteurization unit and fed directly to appropriate equipment for filling unit-sized containers. Additional ingredients in either liquid or dry form may be added during the initial make-up of the slurry or immediately prior to the pasteurization step. The process is well-suited for use in the preparation of gelatin-containing frozen confections.

5 Claims, No Drawings

PROCESS FOR PREPARED, GELATIN-CONTAINING FOOD PRODUCTS

BACKGROUND OF THE INVENTION

Gelatin is a widely used food ingredient and has been used to modify the texture of food product such as desserts, ice cream and frozen confections. An example of such a disclosure is contained in U.S. Pat. No. 4,297,379 to Topalian et al., entitled, "Frozen Aerated Ready-To-Eat Gelatin Composition".

When gelatin is used in the preparation of a ready-to-eat food product (as opposed to a powdered, gelatin-containing mix which the consumer dissolves in water) one of the initial steps in the process has been to dissolve the gelatin in hot water and then to quickly utilize the solution in the preparation of a product, typically a refrigerated or frozen product. As it is known to be undesirable to hold gelatin solutions for a prolonged period of time, especially in a low pH environment, delays in using the gelatin solution have been minimized.

The time limitation for the holding of gelatin solutions results from a combination of two factors — namely, the susceptibility of the gelatin solution to microbial growth and hydrolysis of the dissolved gelatin, especially at acidic conditions and elevated temperatures. Reducing the temperature of the solution in order to slow down microbial growth and/or hydrolysis is not possible as the solution will begin to gel.

Another problem encountered in the formation and use of gelatin solutions is the fact that gelatin hydrates relatively slowly. Accordingly, it is common practice to employ finely ground gelatin (e.g., at least 90% by weight through a 40 U.S. mesh screen and less than 40% by weight through a 100 U.S. mesh screen) and hot water so that the gelatin may be dissolved in a reasonable period of time. The manner in which the gelatin is added to the hot water is, however, limited by the fact that gelatin particles tend to clump together as they are introduced into an aqueous medium. This problem is usually solved by preblending the gelatin particles with another particulate material, typically sugar and/or food acid. Such a preblending step is costly in terms of both time and equipment requirements and would desirably be eliminated.

The inability to maintain an acid-containing gelatin solution for an extended period of time can hamper the continuous production of ready-to-eat (e.g., refrigerated or frozen) gelatin-containing food products. To date, in order to supply an aqueous gelatin solution to continuous heat exchange (e.g., pasteurizer, freezer, etc.) and/or filling equipment, it has been necessary to frequently (e.g., every four hours) prepare fresh gelatin solutions. It would be highly desirable to develop a system for supplying concentrated gelatin solutions to a continuous process without the need for frequent batch preparations of solution.

It is known, as exemplified by U.S. Pat. No. 2,819,970 to Steigman, that cold-water soluble gelatin can be produced by drying an aqueous gelatin solution in a manner which preserves the gelatin in a molecularly-dispersed, amorphous form rather than the usual crystalline form. Cold-water soluble gelatin is, however, relatively expensive, is quite moisture-sensitive and, as noted in U.S. Pat. No. 3,930,052 to De Brou et al., is difficult to disperse in cold water. Consequently, cold-water soluble gelatin has not been used in the commerical production of ready-to-eat, gelatin-continuing food products. The use of cold-water soluble gelatin is not within the scope of the present invention as the gelatin solution would tend to set up (i.e., gel) during extended holding periods.

SUMMARY OF THE INVENTION

A process for the continuous production of ready-to-eat gelatin-containing food products is faciliated by forming an aqueous suspension of crystalline, partially-hydrated gelatin particles and subsequently feeding this suspension through a continuous heat exchanger where the gelatin is dissolved and an aqueous solution suitable for further processing is produced.

According to this invention fine particles of crystalline gelatin (i.e., not cold-water soluble) are combined at a level of from 0.01 to 20% by weight with water having a temperature of from 32° F. (0° C.) to 90° F. (32.2° C.). Clumping of the gelatin particles in the water may be minimized or avoided by preblending the gelatin with properly-sized particles of other ingredients. Preferably, however, any preblending step is avoided and the suspension of gelatin particles in water is obtained by combining the gelatin and water using equipment, such as an eductor or a centrigugal pump, which will supply high shear forces during mixing. It will be possible and in many cases desirable to incorporate into the gelatin suspension, via one or more separate streams, additional dry materials such as sugars, food acids, hydrolyzed cereal solids, etc.

The temperature of the suspension is maintained at below 90° F. so as to permit hydration of the gelatin particles but to avoid actual solubilization of the gelatin. The suspension is kept under constant agitation in order to avoid settling out and possible clumping of the gelatin particles. The agitated suspension may be kept for up to four days or more, even under acidic conditions, without significant adverse effects upon the gelatin. Preferably the temperature of the suspension is kept below about 50° F. (10° C.) in order to prevent microbiological growth.

The gelatin suspension may be combined with other ingredients at any time during the hold stage or before or after a heat treatment step which is effective to solubilize the gelatin and/or pasteurize the ingredients. The hydrated gelatin particles contained in the suspension will be readily solublized upon heating the suspension to above about 120° F. (48.9° C.), it being recognized that solublization will proceed faster at higher temperatures. It is therefore possible by means of this invention to, even after an extended hold-up period, supply an aqueous, gelatin-containing stream to a continuous heat exchanger, such as a pasturizer or sterilizer, and to quickly produce an aqueous gelatin solution which upon cooling yields an edible food product.

DESCRIPTION OF THE PREFERRED EMBODIMENT

Either type A or type B gelatin may be utilized in the present invention. Any Bloom strength could be used in this invention, however, Bloom strengths in excess of 200 (AOAC method) are generally preferred. The particle size of the crystalline gelatin used in this invention is not critical and conventional, food-grade gelatin material is quite suitable. Typical sizes of the gelatin particles will be such that at least 90% by weight of the particles will range between 30 and 200 U.S.S. mesh.

The gelatin and, if desired, other food ingredients such as acids sweeteners (e.g., sugars, corn sweeteners, aspartame, etc.), bulking agents, gums, buffering agents, flavors and colors are combined with water (32° to 90° F.) using a high shear mixer such as a Triblender ™ (available from Triclover Co, Kenosha, Wisconsin). Typically all of the stable, ingredients contained in the end product will be combined in the initial aqueous gelatin suspension. Volatile ingredients such as flavors and ingredients or components such as dairy emulsions, fats and oils, fruit purees and the like can be added, if at all, before final product preparation.

The pH of the suspension will be below 7.0 and for fruit flavored products usually below about 5.0. The suspension will contain from .01 to 20%, usually 1.0 to 10%, gelatin by weight of the water. The suspension is kept below 90° F. and under constant agitation. Any conventional mixer, such as a paddle mixer, may be used to provide sufficient agitation.

This invention makes it possible to store a high-concentration gelatin-water suspension for at least four days without the loss of gelatin functionality and to then quickly and efficiently transform the suspension into a solution from which ready-to-eat gelatin-containing food compositions may be prepared on a continuous bases. This invention also provides the ability to directly add gelatin to a cold-water system without special handling to prevent lumping of the gelatin or other ingredients.

The storage stability of the gelatin suspension of this invention eliminates the need for frequent batching of unstable gelatin solutions.

According to this invention, large batches of an agitated gelatin suspension may be used to feed a continuous process for producing frozen, aseptically-packaged or refrigerated ready-to-eat, gelatin-containing desserts. For instance, a suspension of partially-hydrated gelatin particles also containing food acid, sugar, gums and color may be combined with a volatile flavor and immediately passed to one or more heat exchangers in which the gelatin is quickly solubilized and the ingredients are pasteurized. Conventional high-temperature (above about 180° F.) and short-time (less then 30 seconds) pasteurization conditions would be suitable for use. The solution is then cooled to a temperature below abut 50° F. (10° C.) to retard the loss of any volatile flavors and then passed to a suitable filling apparatus where it is packaged as a ready-to-eat food product which may be marketed and distributed as a refrigerated, aseptically-packaged and/or frozen food product.

It would also be possible to pass the cooled solution to an ice cream-type freezer (e.g., a swept-surface heat exchange) where it is both partially frozen and aerated under controlled conditions before passage to the filling operation. Such a process is more fully described in the aforementioned U.S. Pat. No. 4,297,379 which is hereby incorporated by reference.

The production of a frozen, ready-to-eat composition according to this invention is more fully set forth in the following example.

EXAMPLE 1

11,000 lbs. of water were added to a 2,000 gallon tank with agitation. Dry ingredients consisting of 180 lbs. of gelatin (250 Bloom and in excess of 90%, minus 40 mesh and less than 40%, minus 100 mesh), 63 lbs. of citric acid, 20 lbs. trisodium citrate, 19 lbs. natural gums, 7 lbs. flavoring ingredient, 2 lbs. hydroxypropyl methylcellulose and 1 lb. color were added to the hopper of a Tri Blender ® mixer. Water from the agitated tank was circulated through the Tri-Blender ®, the dry ingredints were dispensed from the hopper and the fluid was fed back to the tank. Circulation of fluid through the Tri-Blender ® was continued until a uniform dispersion/solution of the dry ingredients was formed. Thereafter 3,000 lbs. of sugar syrup and 1,200 lbs. of corn syrup were added to the agitated batch tank and the mixture was pumped to a jacketed hold tank where it was maintained for four days at about 40° F. while under constant agitation. Thereafter, in order to solubilize the dispersed gelatin and pasteurize the ingredients, the mixture was fed through a continuous heat exchanger where it was heated to 180° F. for 15 seconds. The pasteurized solution was then cooled to 50° F. and passed to conventional freezing and filling equipment in order to produce pop-shaped, frozen confections.

We claim:

1. A process for preparing gelatin-containing, ready-to-eat food product comprising the steps of:
   (a) combining particles of crystalline gelatin and water to form a uniform suspension of partially-hydrated gelatin particles, said water having a temperature of from 32° to 90° F., said gelatin being present at a level of from 0.01 to 20% by weight of the water, and said uniform suspension being effected by means of high shear mixing;
   (b) maintaining the suspension at a temperature between 32° and 90° F. and continuously agitating the suspension to maintain uniformity until such time as the suspension is desired for use in the manufacture of a ready-to-eat food product;
   (c) heating the suspension to a temperature in excess of 120° F. for a period of time sufficient to solubilize the gelatin; and then
   (d) passing the gelatin-containing solution into a plurality of containers.

2. A process according to claim 1 wherein the suspension of step (a) further comprises a food acid.

3. A process according to claim 2 wherein the suspension of step (a) includes essentially all of the non-volatile ingredients contained in the comestible.

4. A process according to claim 1 wherein the solubilized gelatin-containing solution of step (d) is combined with other ingredients contained in the comestible.

5. A process according to claim 1 wherein the gelatin is present at a level of from 1.0 to 10% by weight of the water.

* * * * *